(No Model.)
A. M. BURGHER.
CONDUIT ELECTRIC RAILWAY.
No. 532,261. Patented Jan. 8, 1895.
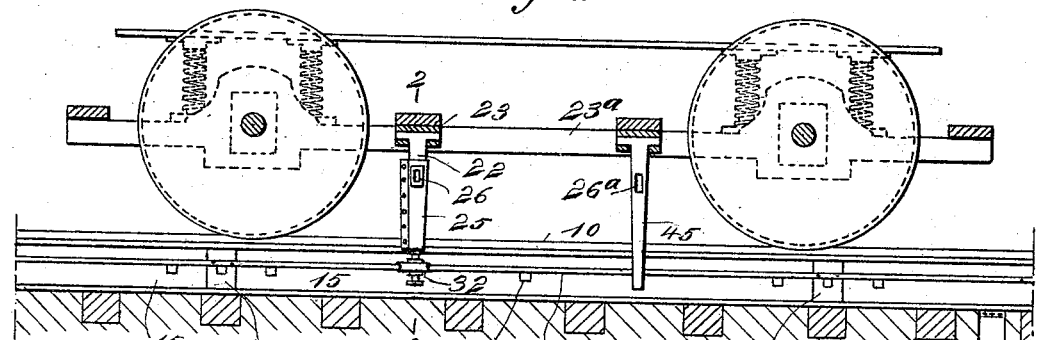
Fig. 1.
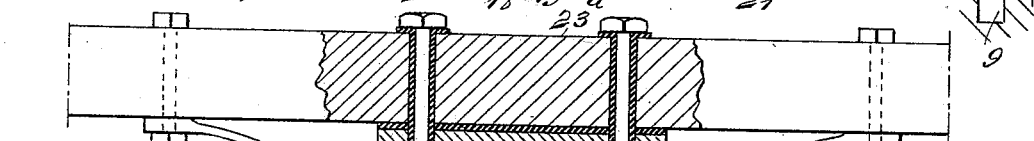
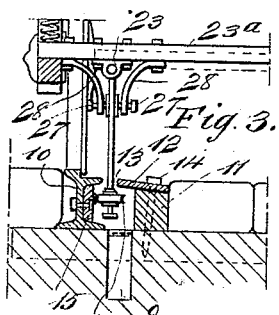
Fig. 3.
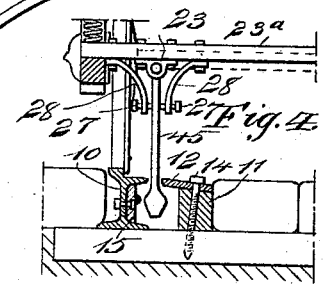
Fig. 4.
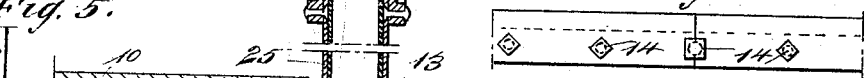
Fig. 2. Fig. 6.
Fig. 5. Fig. 7.
Fig. 8.
WITNESSES:
Donn Twitchell
N. B. Hutchinson
INVENTOR
A. M. Burgher
BY Munn & Co.
ATTORNEYS.

UNITED STATES PATENT OFFICE.

ALBERT M. BURGHER, OF CLAY CITY, KENTUCKY.

CONDUIT ELECTRIC RAILWAY.

SPECIFICATION forming part of Letters Patent No. 532,261, dated January 8, 1895.

Application filed April 17, 1894. Serial No. 507,839. (No model.)

*To all whom it may concern:*

Be it known that I, ALBERT M. BURGHER, of Clay City, in the county of Powell and State of Kentucky, have invented a new and Improved Electric Railway, of which the following is a full, clear, and exact description.

My invention relates to improvements in electric railways, and particularly to electric railways such as are adapted for use in street traffic, although the invention may be used for other purposes.

The object of my invention is to produce a cheap and simple system of electric propulsion, which will dispense with the overhead trolley system and also do away with the expensive underground conduits sometimes employed.

A further object of my invention is to produce an electric railway system having a shallow conduit, one side of which is formed by one of the rails, and to provide in this conduit, a cheap and efficient means of insulation and drainage, and further to construct and arrange the trolley arm so that it may have the necessary flexibility and still be sure of making a positive contact with the line conductor.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a sectional elevation, showing my improved conduit and the manner in which the trolley arm and guard are supported from a railway truck. Fig. 2 is an enlarged detail sectional view on the line 2—2 of Fig. 1, and shows the detail construction of the trolley arm, also its manner of contact with the line conductor. Fig. 3 is a sectional elevation, showing an end view of the trolley arm. Fig. 4 is a similar elevation, showing the arrangement of the trolley guard which travels in front of the trolley arm to protect the latter. Fig. 5 is a detail sectional view, showing how the hub of the trolley wheel is secured to the trolley arm. Fig. 6 is a plan view of the guard plate which covers a portion of the conduit, and the view illustrates the manner of fastening the plates. Fig. 7 is a detail perspective view of one of the insulating blocks to which the line conductor is secured. Fig. 8 is a detail side elevation of the lower end of the hub of the trolley wheel.

My improved system employs a shallow conduit, one side of which is formed by the rail 10 which is of the ordinary kind, while the opposite side of the conduit is formed by a timber 11 laid parallel with the rail, and at intervals, if the conduit is laid in wet ground, are sink holes 9, in the conduit bottom, which are adapted to gather the water and prevent it from interfering with the line wire. The top of the conduit is formed in part by the top of the rail 10 and by a guard plate 12 which is secured to the top of the timber 11 by lag screws 14, or equivalent fastenings, these being arranged as shown in Fig. 6, and a slot 13 is left between the guard plate 12 and the rail 10 for the trolley arm. Secured to the web of the rail 10 is an insulating strip 15, of well seasoned wood or equivalent material, which is held to the rail by bolts 16, the heads of which are countersunk in the strip 15, and the strip is coated with insulating paint 17.

Where the rails abut, the strip 15 takes the place of the fish plate on the inner side of the rails, and the bolts 16 may be fastened to the fish plates on the outer sides, in the usual manner. The heads of the bolts are covered by insulating blocks 18 against which the line wire 19 rests, which wire is fastened to the block 18 and strip 15 by screws 20, see Fig. 2, and the line wire is also secured to the insulating blocks 21 which are arranged at necessary intervals between the strips 15, see Fig. 1, each block 21 having a countersunk hole 21$^a$ to receive a fastening bolt and holes 21$^b$ to receive the fastening screws 20 which hold the line wire 19 in place. The line wire 19 is of copper and is rounded on its outer side, but has a flattened face to fit snugly against the insulating blocks 18 and 21.

In connection with the conduit, a trolley arm 22 is used, which is adapted to run in the slot 13 and is pivoted at the top so as to have a limited lateral movement, in a bracket 23 which is insulated on and rigidly fastened to the truck frame 23$^a$. That portion of the trolley arm which lies adjacent to the conduit top is coated with insulating material 24 which is held in a casing 25, thus providing against the grounding of the circuit, and on the opposite sides of this casing are recessed wear plates 26 which receive the screws 27 in the ends of the curved springs 28 which are rigidly attached to the frame 23ª and which, pressing with equal tension on opposite sides of the trolley arm, hold the latter perpendicularly and yet permit the car and trolley arm to have the necessary lateral movement in relation to each other.

The trolley arm has, near its lower end, a rigid shoulder 29 and at its lower end a detachable collar 30, between which shoulder and collar are arranged springs 31 to press against the hub of the trolley wheel 32. This trolley wheel is grooved, as shown clearly in Fig. 2, so as to fit snugly on the line wire 19, and it is provided with ball bearings 33 where it runs on the hub, which consist of two similar parts 34 and 35 arranged one beneath the other and screwed together, as shown at 36. These hub sections have radial holes 37 to receive screws 38, by which they are centered on the trolley arm, and a screw of each section is adapted to enter the longitudinal slot 39 in the trolley arm, which arrangement prevents the hub from turning, but permits it to move vertically. The hub is held in proper position by the springs 31, but has sufficient vertical movement to provide for the up and down vibration of the car. To insure a perfect contact in connection, between the wheel and hub, the trolley wheel is provided with a radial bore 40 in which is held a copper plunger 41, the inner end of which is held to snugly fit the hub, and the plunger is held in close contact with the hub by a spring 42, which is secured by a screw 43. The current is thus carried from the line wire 19, through the trolley wheel and arm 22, from which it is taken by a cable 44 and carried to the motor in the usual manner.

In front of the trolley arm is carried a guard 45, see Fig. 4, which is similar to the trolley arm and is hung in the same way in a bracket 23 and is also centered by springs 28 as above specified. It has side recesses 26ª to receive the screw 27 of the springs 28, and is adapted to run in advance of the trolley arm so as to brush aside any possible obstruction.

It will be seen from the foregoing description that the construction illustrated is very simple and efficient, that means are provided for making a positive contact with the line wire, and that the conduit construction is such that the conduit may be very cheaply and rapidly made.

Having thus described my invention, I claim as new and desire to secure by Letters Patent—

1. In an electric railway system, the conduit comprising a track rail, a timber laid parallel with the rail, a top plate secured to the timber, and an insulating plate on the web of the rail adapted to support a line wire, substantially as described.

2. In an electric railway system, the combination with the conduit and the rail forming one side thereof, of the insulating strip secured to the rail, the insulating blocks on the strip, and the line wire secured to the blocks, substantially as described.

3. In an electric railway system, the improved trolley, comprising a suspending trolley arm, a vertically movable hub on the trolley arm, and a trolley wheel journaled on the hub, substantially as described.

4. The combination, with the trolley arm, the hub thereon and the radially bored wheel on the hub, of the conducting plunger in the bore, a spring to press the plunger into contact with the hub, and a screw backing for the spring, substantially as described.

5. The combination, with the trolley arm, of the vertically movable spring-cushioned hub thereon, and the trolley wheel journaled on the hub, substantially as described.

6. The combination, with the grooved trolley arm, of the two-part hub thereon having screws to enter the groove, and the trolley wheel journaled on the hub, substantially as described.

7. In an electric railway system, the trolley, comprising a laterally movable trolley arm, springs arranged to press against opposite sides of the arm, and a trolley wheel carried by the arm, substantially as described.

8. In an electric railway system, the trolley, comprising a laterally swinging trolley arm, a trolley wheel thereon, springs arranged to press against opposite sides of the arm, and an insulated casing encircling the arm, substantially as described.

9. In an electric railway system, the combination, with the trolley arm, of the laterally yielding guide arm suspended in front of it, and springs against the action of which the said guide arm yields substantially as described.

ALBERT M. BURGHER.

Witnesses:
EDWARD N. WILSON,
GEORGE W. HERRON.